United States Patent [19]
Hailey et al.

[11] Patent Number: 5,602,870
[45] Date of Patent: Feb. 11, 1997

[54] DIGITAL SIGNAL PROCESSING

[75] Inventors: Keith R. Hailey, Amersham; Jennifer C. Loveridge, North Harrow, both of England

[73] Assignee: Eastman Kodak Company, Rochester, N.Y.

[21] Appl. No.: 641,709

[22] Filed: May 2, 1996

Related U.S. Application Data

[62] Division of Ser. No. 241,311, May 10, 1994, abandoned.

[30] Foreign Application Priority Data

Jun. 9, 1993 [GB] United Kingdom .................. 9311942

[51] Int. Cl.$^6$ ..................................... H03H 7/30
[52] U.S. Cl. ..................... 375/230; 348/240; 348/347
[58] Field of Search .................................. 375/230, 229, 375/350; 364/724.1; 348/538, 398, 240, 347, 581, 582, 561

[56] References Cited

U.S. PATENT DOCUMENTS

| | | | |
|---|---|---|---|
| 4,286,291 | 8/1981 | Taylor et al. ............................ | 348/397 |
| 4,709,394 | 11/1987 | Bessler et al. ........................... | 348/408 |
| 5,119,193 | 6/1992 | Noji ......................................... | 348/629 |
| 5,177,610 | 1/1993 | Wilkinson ............................... | 348/452 |
| 5,202,756 | 4/1993 | Sasaki et al. ............................ | 348/659 |
| 5,243,433 | 9/1993 | Hailey .................................... | 348/240 |
| 5,280,351 | 1/1994 | Wilkinson ............................... | 348/412 |
| 5,374,995 | 12/1994 | Loveridge et al. ..................... | 348/240 |
| 5,406,334 | 4/1995 | Kondo et al. ........................... | 348/240 |

FOREIGN PATENT DOCUMENTS

WO91/07848  5/1991  WIPO .............................. H04N 7/01

Primary Examiner—Stephen Chin
Assistant Examiner—Tesfaldet Bocure
Attorney, Agent, or Firm—Francis H. Boos, Jr.

[57] ABSTRACT

In digital image processing, it is often necessary to alter the image by performing a zoom operation thereon. Such an operation is carried out with the use of a spatial interpolation unit. Described herein is a spatial interpolation unit which comprises a discrete set of filters for which at least some of the cut-off frequencies are logarithmically spaced.

8 Claims, 6 Drawing Sheets

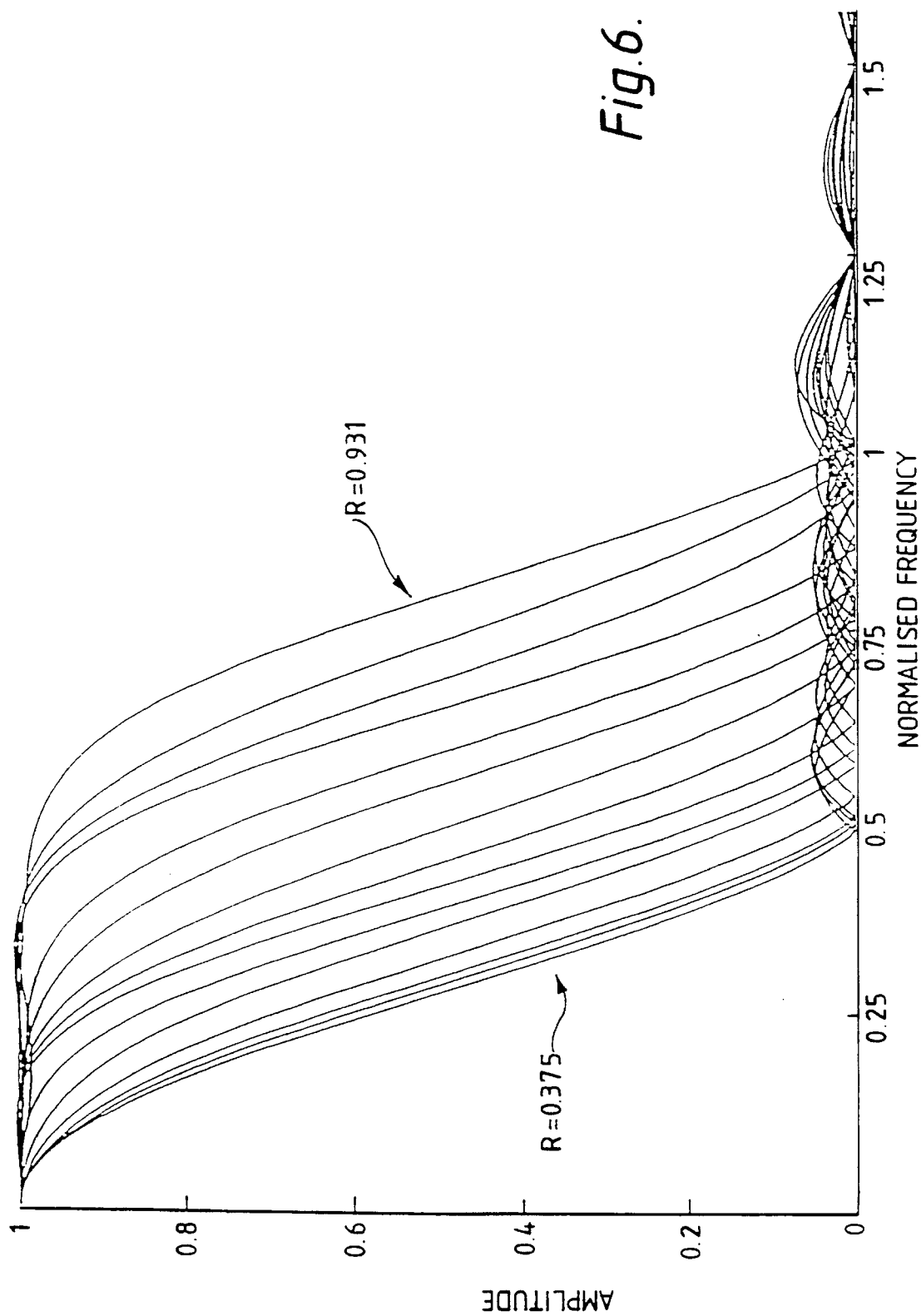

DIGITAL SIGNAL PROCESSING

This is a Divisional of application Ser. No. 08/241,311, filed May 10, 1994 abandoned.

FIELD OF THE INVENTION

The present invention relates to digital signal processing and is more particularly concerned with the implementation of continuous zoom to a digital image.

BACKGROUND OF THE INVENTION

In electronic or hybrid imaging systems where the input comprises either stationary images or time-varying image sequences, it may be desired to subject these images or image sequences to static or dynamic spatial interpolation (pan or zoom). The interpolation may be required for spatial standards conversion, for image magnification within a fixed spatial standard, or other applications.

In general, spatial interpolation is achieved by means of a low-pass filter which attenuates all frequencies above the nyquist frequency of the output signal (anti-aliasing) whilst maximising pass-band response and enables a variable phase-shift of the output signal with respect to the input signal. In the case of dynamic zoom, since the zoom ratio varies from frame-to-frame, it is also required that the cut-off frequency of the interpolation filter be easily adjustable.

A control parameter, zoom ratio, R, can be defined as the quotient of m/n where m is the pixel length of the output from a spatial interpolation unit, and n is the pixel length corresponding to a particular image feature input to the spatial interpolation unit, m and n being measured to sub-pixel accuracy. The definition of this control parameter holds for both image magnification within a fixed spatial standard and for spatial standards conversion. The cut-off frequency of each filter, described in terms of a fraction of the input nyquist frequency, is therefore defined to be equal to the zoom ratio.

In some applications where speed is not a limiting factor, it may be possible to generate the interpolation filter coefficients for the zoom ratio required for each image frame in-situ. Two possible methods can be used to achieve this as is well known:

1) using a windowed sinc function (*Digital Image Processing,* W K Pratt, Wiley-InterScience, pages 291 to 295) as a continuous or sampled impulse response. The window width (Hamming window is often preferred) defines the number of filter taps, and the cut-off frequency is defined by the width of the sinc function.

2) using an optimisation method to generate a low-pass filter with variable cut-off frequency and stop- and pass-band performance, for example, the Remez Exchange Algorithm (*Theory and Application of Digital Signal Processing,* Rabiner and Gold, Prentice-Hall 1975, pages 136 to 140).

Problem to be Solved by the Invention

However, due to the high rates at which the digital image processing takes place, it is often impractical to calculate the filter coefficients at each stage during a zooming process. This is because the filter coefficients are required to change in accordance with the desired zoom ratio.

Furthermore, in the case where a windowed sinc function is used, the cut-off frequency of the filter is inversely related to the width of the sinc function. In cases where $R \ll 1.0$, it may not be possible to generate a windowed sinc function with a fixed number of taps.

SUMMARY OF THE INVENTION

It is therefore an object of the present invention to provide a spatial interpolation unit which overcomes the problems mentioned above.

In accordance with one aspect of the present invention, there is provided a spatial interpolation unit characterised in that the spatial interpolation is implemented by means of a discrete set of filters.

Preferably, the filters are digital filters, and at least some of the cut-off frequencies of the filters of the discrete set are logarithmically spaced.

Advantageous Effect of the Invention

By this arrangement, an appropriate filter can be selected from the set in accordance with the value of the zoom ratio.

In particular, the process of selecting from a set of pre-designed interpolation filters a filter with a cut-off frequency appropriate to the required zoom ratio is substantially more simple to implement in hardware than the on-line calculation of the impulse response of an appropriate interpolation filter. As a result, it is practical to use this approach to obtain the required interpolation-filter coefficients during the frame-period of a system which operates at television frame rates, for example.

Furthermore, since the filter set is designed off-line, it is possible to use a filter design technique which optimises the characteristics of each filter within the set. For example, a filter generated from a windowed sinc function may have an optimum response for use when the value of the zoom ratio is close to 1.0, that is, when the output nyquist frequency of the image is close to the input nyquist frequency.

In the case of a dynamic zoom sequence, it is necessary to design the filter set so that the cut-off frequency of some or all of the filters within the set is spaced logarithmically in order to minimise perceptible changes in sharpness which may result from the use of a discrete filter set.

The filter coefficients are stored as a pre-designed family of interpolation filters. Each filter within the family has a predefined number of taps and intermediary coefficients are provided to enable the interpolation to be performed to a predefined and discrete sub-pixel accuracy. The interpolation filters are closely related in terms of pass-, transition- and stop-band characteristics, but have different cut-off frequencies to cover the range required in the application, up to the nyquist frequency of the input signal.

BRIEF DESCRIPTION OF THE DRAWINGS

For a better understanding of the present invention, reference will now be made, by way of example only, to the accompanying drawings in which:

FIG. 6 illustrates the frequency responses of a filter set in accordance with the present invention.

DETAILED DESCRIPTION OF THE INVENTION

It is known to use a telecine film scanner for scanning image pixel areas on motion picture film to produce image pixel data corresponding to those image pixel areas. Size alteration effected by vertical and/or horizontal enlargement or expansion will be called zooming and orientation alteration effected by side-to-side or up and down movement will be called panning.

Figure 1:
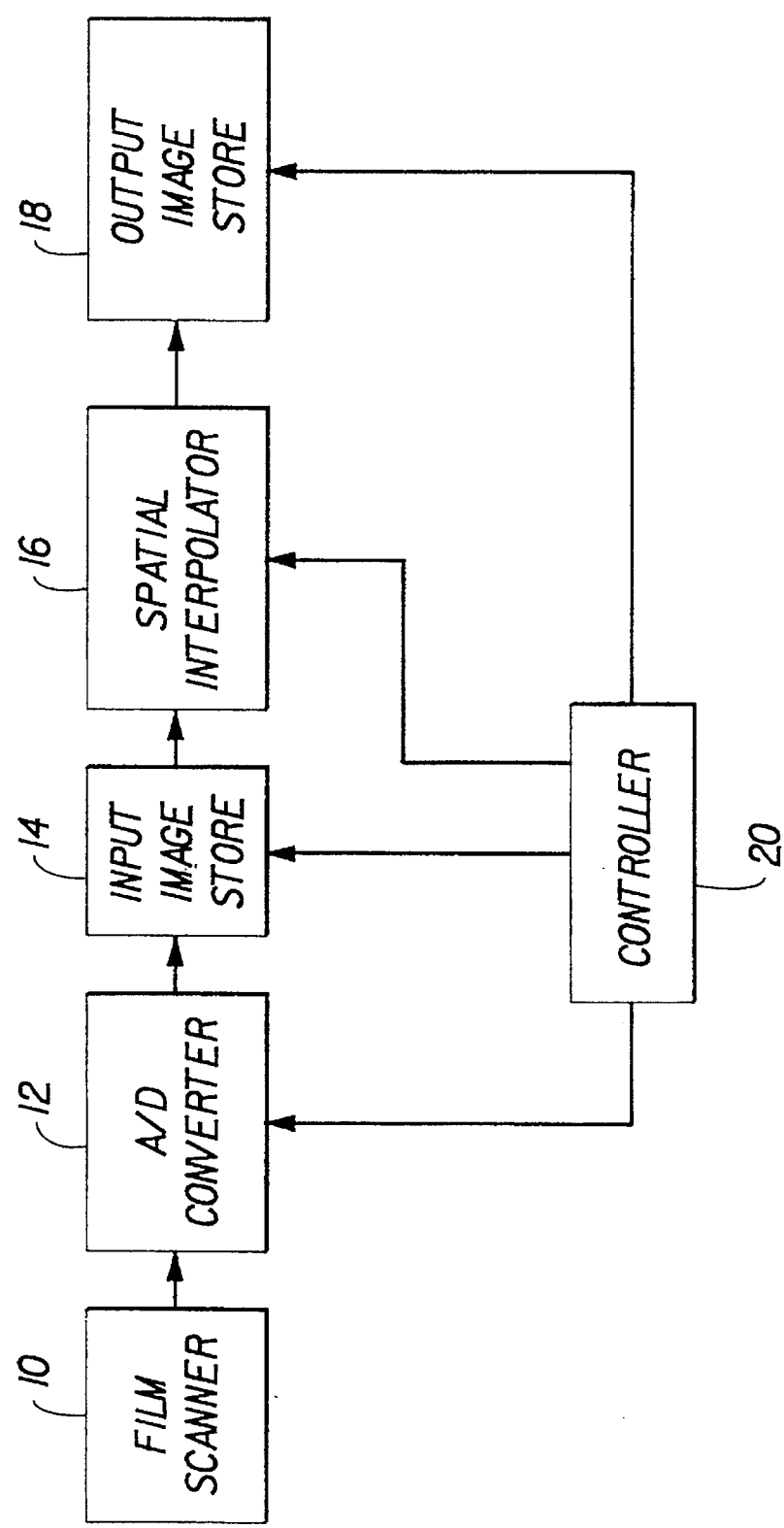
FIG. 1 illustrates a simplified block diagram of a known imaging system which includes a spatial interpolation unit.

A known signal processing channel for use in a telecine film scanner for altering the size and orientation of a video image is shown in FIG. 1. A film scanner 10 develops image pixel data corresponding to image pixel areas on a motion picture film. The signal processing channel comprises an analog-to-digital (A/D) converter 12, an input image store 14, a spatial interpolation unit 16, and an output image store 18. A controller 20 provides system timing for pipelined operation according to the scanning speed of the film scanner 10 and the television standard being used.

Film pixel data from the film scanner 10 is converted to digital pixel data by the A/D converter 12 and applied to the input image store 14 at a real-time, synchronous rate determined by the controller 20.

Figure 2:
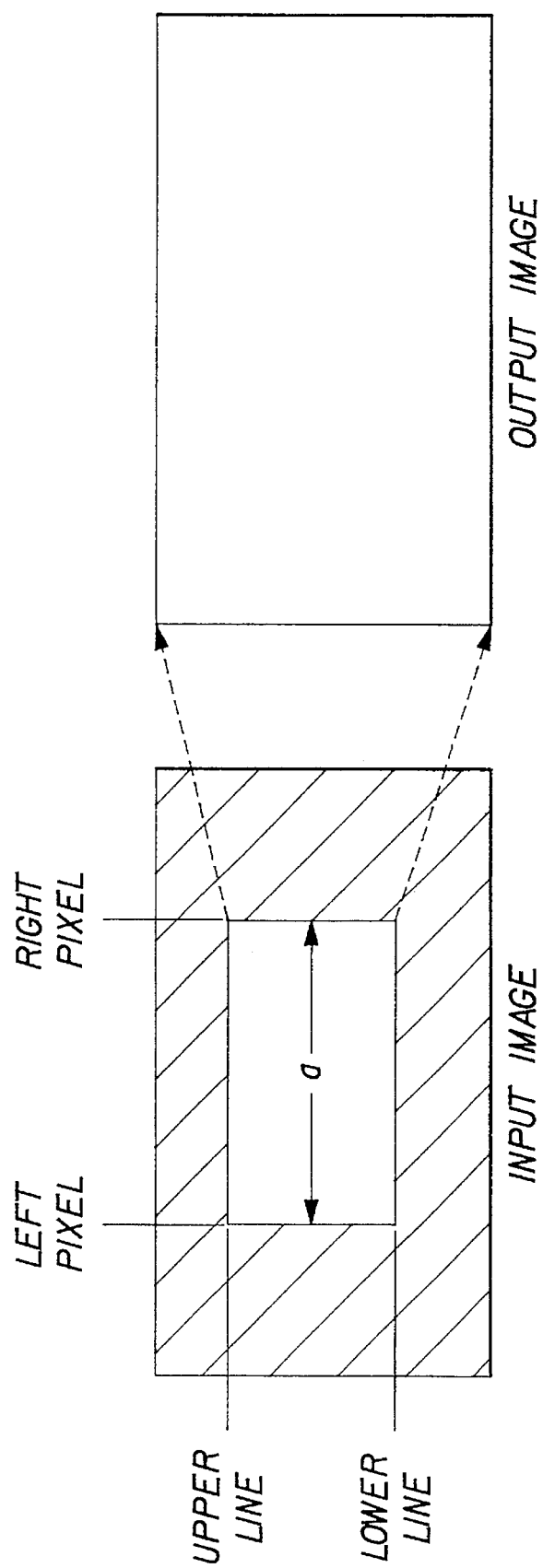
FIG. 2 illustrates zoom effects in connection with an image frame.

In normal operation, that is, without zooming or panning, active lines are selected from the input store 14 by the controller 20 and are passed unmodified as to size or orientation to the output image store 18 via the spatial interpolation unit 16. In performing a zoom operation, as is shown in FIG. 2, a new output image is derived from a limited amount of input data. In order to maintain the required data rate in number of lines and pixels, the new output image data is interpolated from the input data in the spatial interpolation unit 16. The channel data rate is maintained at the level required for pipelined operation by controlling the readout of the input image store 14. Over an active portion a of the input image (FIG. 2), lines and pixels are repeated as necessary for optimum interpolation of the new output data.

Figure 3:
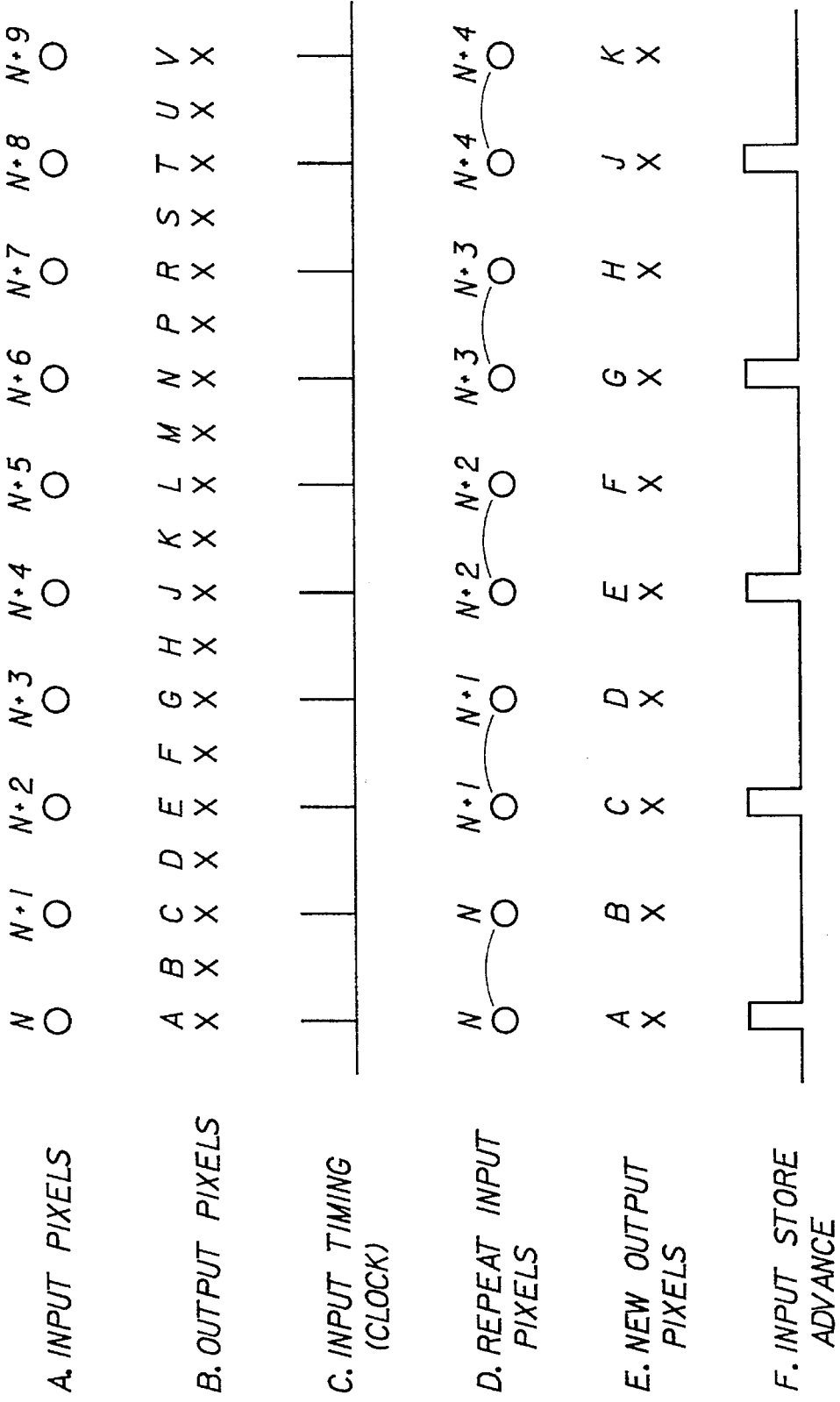
FIG. 3 is a timing diagram for a 2:1 zoom obtained using the imaging system shown in FIG. 1.

A simple example for a 2:1 zoom ratio is given in FIG. 3. Line A shows original input pixels from the portion a of the full input image produced according to the system timing illustrated in Line C. Line B illustrates the output pixels needed for a 2:1 zoom from the active portion a to produce a full-sized output image (FIG. 2). Thus, Lines A and B represent the spatial relationship between the original input and "zoomed-in" pixels respectively. Zooming is obtained by writing into the input store 14 at the synchronous rate represented by the Line C timing and then controlling the readout of the input store so as to repeat samples in its output. In the example shown in FIG. 3, this is done by advancing the read address for every other input clock, as shown by Line F, thereby repeating pixels as shown in Line D. The repeated pixels are then subjected to a linear interpolation in the spatial interpolation unit 16. The interpolated pixels are shown in Line E relative to the synchronous timing of Line C. In accordance with a simple linear interpolation, output (repeat) pixel B will be the average of input pixels N and N+1, (repeat) pixel D the average of input pixels N+1 and N+2, and so on.

Figure 4:
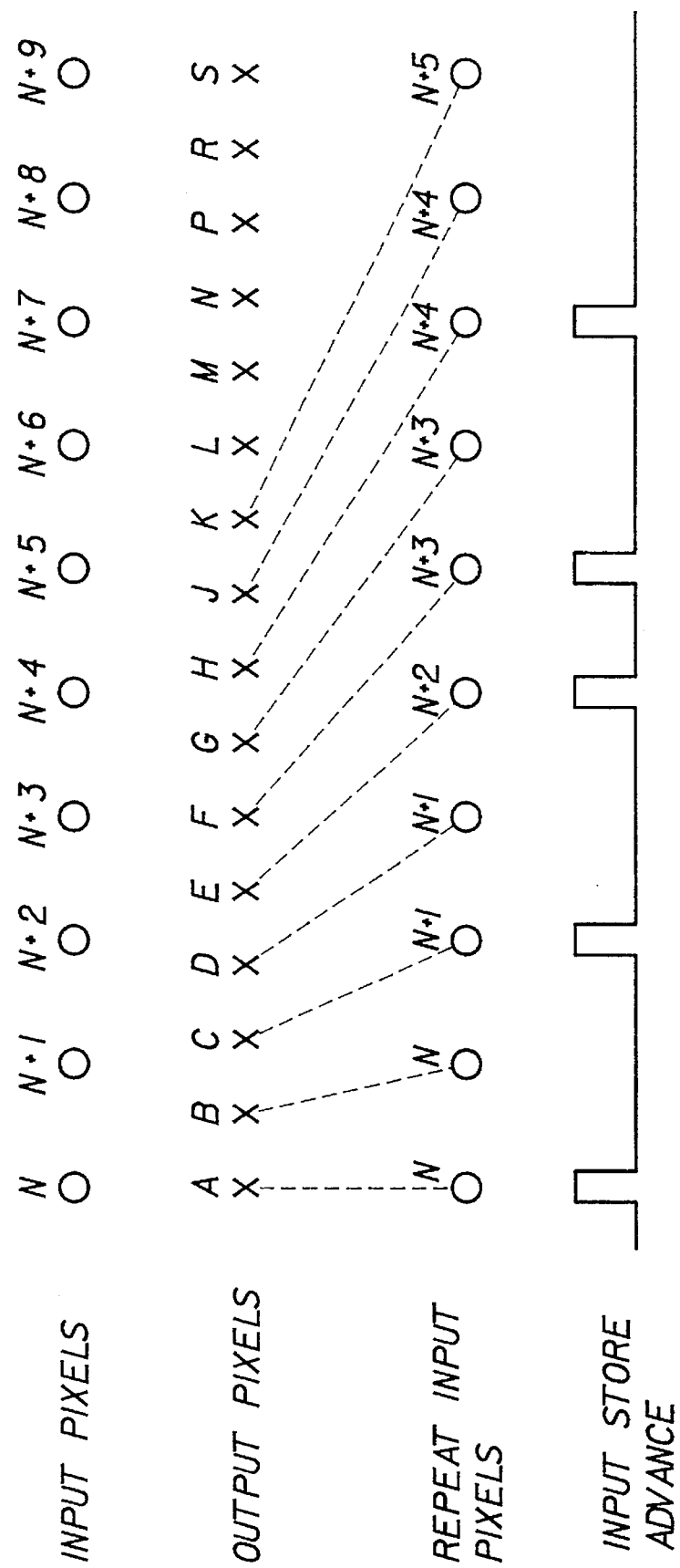
FIG. 4 is a timing diagram for a 1.33:1 zoom obtained using the imaging system shown in FIG. 1.

For other zoom ratios, the control pulses and repeat line/pixel sequences are more complex but the same principles apply. An example for a 1.33:1 zoom is shown in FIG. 4.

In addition to zooming, it is often desirable to pan the image side-to side or up and down to position the zoomed area of interest. Obtaining all of these effects necessitates a random access design for the input store 14. This has a disadvantage in that it complicates pipelined operation.

Commonly assigned U.S. patent application Ser. No. 07/817,204, now U.S. Pat. No. 5,243,433, describes a digital image interpolation system which is more amenable to pipelined operation. Here, it is beneficial to separate the vertical and horizontal aspects of image alteration. More particularly, a video image alteration apparatus is described wherein pixels relating to an input image derived from a frame of film are sampled at a predetermined rate related to a film scanning speed and a television line standard, and the flow of pixel information is coordinated through a memory section by write control and read control signals. A frame store is provided which stores image pixel data corresponding to at least one film frame, and includes a line output and address inputs for selecting a line start position and a line advance increment. To obtain spatial separation, a line store responsive to the line output of the frame store is provided for storing at least one line of image pixel data, and includes a pixel output and address inputs for selecting a pixel start position and a pixel advance increment. New image pixels are generated by a spatial interpolation unit responsive to the pixel output of the line store.

Lines and pixels are repeated as necessary for optimum interpolation by appropriately addressing the frame store for vertical repeats and the line store for horizontal repeats.

The spatial interpolation unit described above is required to fulfil a number of functions including:

i) down-conversion of image signals from high definition television (HDTV) to 525-line, 625-line and other standards;

ii) dynamic and static zoom of 525-line and 625-line sequences generated from HDTV input sequences;

iii) conversion between different HDTV standards; and iv) geometry changes, for example, rotation and aspect ratio adjustment, to HDTV and down-converted sequences from HDTV.

In general, these functions can be separated into two classes:

1) those which require a zoom ratio, either horizontally or vertically or both, which is greater than or equal to 1.0. In all such applications, because there is no appropriate information in the input signal beyond the input nyquist frequency, the filter with cut-off frequency at the input nyquist frequency (R=1.0) is selected by the spatial interpolation unit;

2) those which require a zoom ratio, either horizontally or vertically or both, which is less than 1.0. In this particular application, the zoom ratio lies in the range 0.375<R<1.0, and a discrete set of fifteen filters is provided with cut-off frequencies which are space logarithmically for smaller values of R, but become more linearly spaced as R approaches 1.0.

Figure 5:
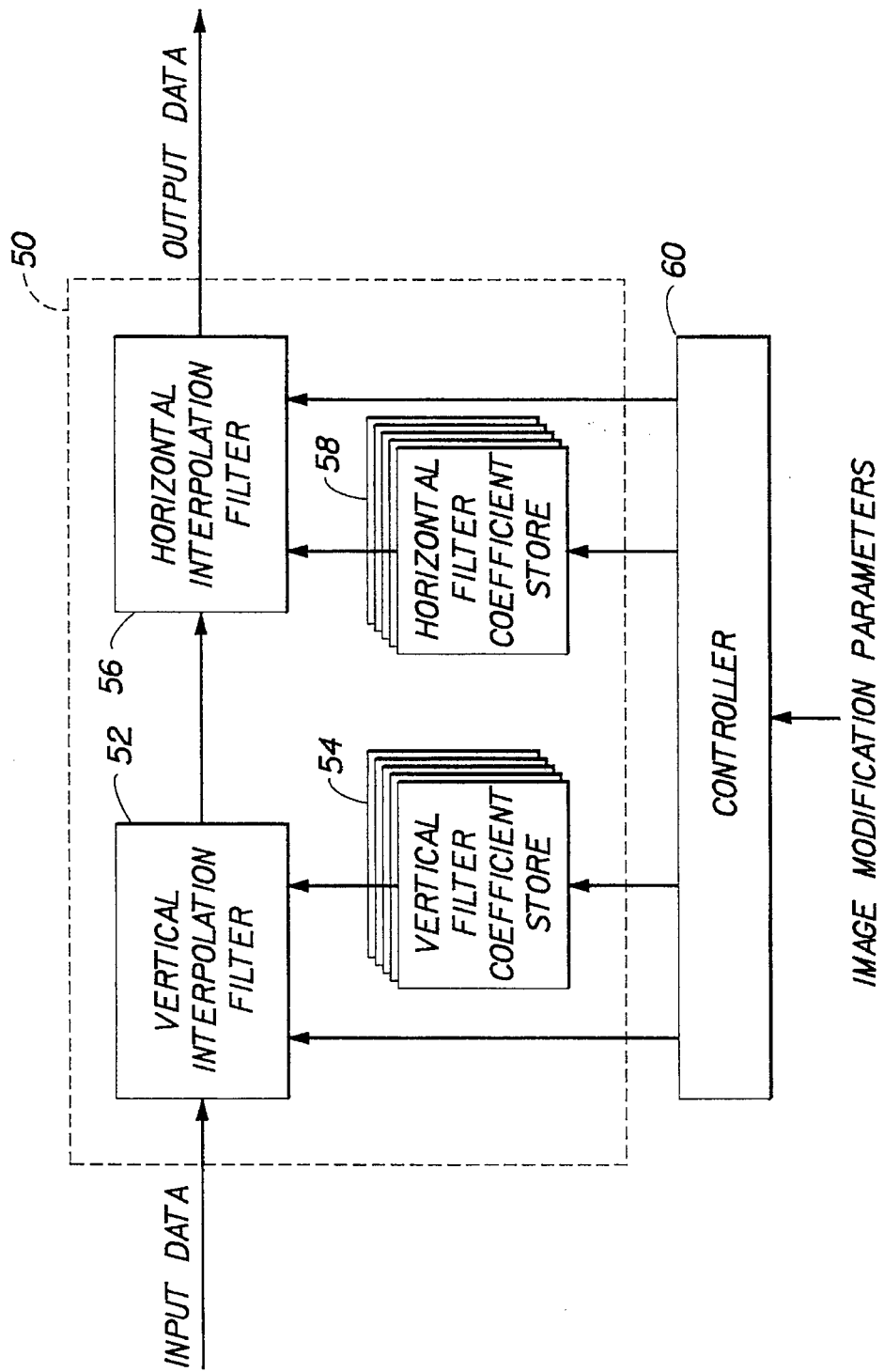
FIG. 5 illustrates a schematic block diagram of a spatial interpolation unit in accordance with the present invention.

FIG. 5 illustrates a spatial interpolation unit 50 which can be used to carry out the zooming function. The unit 50 comprises a vertical interpolation filter 52, a vertical filter coefficient store 54, a horizontal interpolation filter 56, and a horizontal filter coefficient store 58. A controller 60 is also connected to the unit 50.

The vertical filter 52 and the horizontal filter 56 are arranged in series so that input pixel data is first processed by the vertical filter 52 and then by the horizontal filter 56 to provide the desired output data. Each filter 52, 56 and its associated filter coefficient store 54, 58 is controlled by the controller 56.

In operation, for a given dimension, that is, either the horizontal or vertical aspect of image alteration, the required zoom ratio, R, is input to the spatial interpolation unit 50 from the controller 60. The appropriate interpolation filter, which has a cut-off frequency which is closest to but smaller than R is selected from the set of 15 filters, is selected and then used to modify the input pixel data in that dimension in accordance with the system described in U.S. patent application Ser. No. 817,204 discussed above.

In this application, therefore, a total of 16 filters are provided, each filter having 8 taps and 8-bit coefficients. The impulse response of each filter is sampled at 16 phase-shift positions, enabling the position of the output pixel values to be accurate to $\frac{1}{16}$th of the input pixel spacing. As a result, each single filter comprises 128 coefficients.

The two-dimensional filtration is implemented separably by means of two one-dimensional filters in the spatial interpolation unit 50. It is therefore possible to use different filters in the horizontal and vertical directions to provide unequal X–Y magnification.

Frequency responses of the filter set are shown in FIG. 6. In relation to FIG. 6, there is a total of 16 filters in the set, of which 15 (all but R=1.0) are plotted on the graph. Their cut-off frequencies are as follows with the logarithmically spaced filters denoted by an asterix (*):

| | | |
|---|---|---|
| R = 0.375* | R = 0.494* | R = 0.680* |
| R = 0.385* | R = 0.530 | R = 0.754 |
| R = 0.400* | R = 0.569* | R = 0.809 |
| R = 0.423* | R = 0.610 | R = 0.868* |
| R = 0.457* | R = 0.655 | R = 0.931 |

It may be noted that the cut-off frequencies, that is, the values of R, listed above are design intentions and when digital filters are designed, it is within the conflicting constraints of total number of filter taps, transition bandwidth, cut-off frequency, etc. It will follow therefore that the actual cut-off frequencies in the filter frequency responses plotted may vary a little from the design intention.

We claim:

1. A method of implementing continuous zoom to a digital image, the method comprising the steps of:
   a) receiving a digital image signal;
   b) inputting a desired zoom ratio;
   c) using the input zoom ratio to select at least one interpolation filter having a predetermined cut-off frequency from at least one set of interpolation filters to provide at least one interpolation filter, the cut-off frequencies of at least some of the interpolation filters in the set being logarithmically spaced;
   d) applying said selected interpolation filter to the digital image signal to effect the desired zooming; and
   e) providing an output digital signal to which the desired zooming has been applied.

2. A method according to claim 1, wherein step c) includes selecting a vertical filter coefficient.

3. A method according to claim 1, wherein step c) includes selecting a horizontal filter coefficient.

4. Digital image signal spatial interpolation apparatus for continuous zoom of a digital image comprising:
   means for receiving a digital image signal:
   means for inputting a desired zoom ratio;
   a discrete set of filters for one spatial dimension, said set of filters having a plurality of cut-off frequencies; and
   means responsive to said inputted desired zoom ratio for applying a selected filter from said discrete set of filters to the digital image signal to effect a corresponding desired zooming operation.

5. The spatial interpolation apparatus of claim 4 in which at least some of said cut-off frequencies are logarithmically spaced.

6. Digital image signal spatial interpolation apparatus for continuous zoom of a digital image comprising:
   means for receiving a digital image signal:
   means for inputting a desired zoom ratio;
   a first discrete set of filters for a first spatial dimension;
   a second discrete set of filters for a second spatial dimension, at least one of said first and second discrete sets of filters having a plurality of cut-off frequencies; and
   means responsive to said inputted desired zoom ratio for applying a selected filter from at least one of said first and second discrete sets of filters to the digital image signal to effect a corresponding desired zooming operation.

7. The spatial interpolation apparatus of claim 6 in which both of said discrete sets of filters have said plurality of cut-off frequencies.

8. The spatial interpolation apparatus of claim 6 or 7 in which at least some of said cut-off frequencies are logarithmically spaced.

* * * * *